(12) United States Patent
Zhong

(10) Patent No.: US 9,167,159 B2
(45) Date of Patent: Oct. 20, 2015

(54) CAMERA MOBILE PHONE WITH ANTI-SHAKING FUNCTION AND ANTI-SHAKING METHOD FOR USE BY THE CAMERA MOBILE PHONE IN IMAGE CAPTURING

(75) Inventor: Rili Zhong, Huizhou (CN)

(73) Assignee: HUIZHOU TCL MOBILE COMMUNICATION CO., LTD., Huizhou, Guangdong Province (CN)

( * ) Notice: Subject to any disclaimer, the term of this patent is extended or adjusted under 35 U.S.C. 154(b) by 308 days.

(21) Appl. No.: 13/381,948

(22) PCT Filed: Dec. 10, 2010

(86) PCT No.: PCT/CN2010/079656
§ 371 (c)(1),
(2), (4) Date: Dec. 31, 2011

(87) PCT Pub. No.: WO2011/069467
PCT Pub. Date: Jun. 16, 2011

(65) Prior Publication Data
US 2012/0108292 A1 May 3, 2012

(30) Foreign Application Priority Data

Dec. 11, 2009 (CN) .......................... 2009 1 0188891

(51) Int. Cl.
*H04N 5/232* (2006.01)

(52) U.S. Cl.
CPC ....... *H04N 5/23248* (2013.01); *H04N 5/23258* (2013.01); *H04N 5/23267* (2013.01); *G03B 2205/0007* (2013.01); *G03B 2217/005* (2013.01); *H04M 2250/12* (2013.01); *H04M 2250/52* (2013.01)

(58) Field of Classification Search
CPC ................ G03B 2205/0007; G03B 2217/005; G01C 19/00–19/38; H04N 5/2328; H04N 5/23258; H04N 5/23267; H04N 5/23248; H04M 2250/12; H04M 2250/52
USPC ........................................ 348/208.99–208.13
See application file for complete search history.

(56) References Cited

U.S. PATENT DOCUMENTS

| | | | | |
|---|---|---|---|---|
| 5,835,138 | A | * | 11/1998 | Kondo ...................... 348/207.99 |
| 8,294,773 | B2 | * | 10/2012 | Oshino et al. .............. 348/208.6 |
| 2001/0010544 | A1 | | 8/2001 | Wakui |

(Continued)

FOREIGN PATENT DOCUMENTS

| CN | 1574898 A | 2/2005 |
|---|---|---|
| CN | 1630304 A | 6/2005 |

(Continued)

*Primary Examiner* — Pritham Prabhakher
(74) *Attorney, Agent, or Firm* — Cheng-Ju Chiang

(57) ABSTRACT

A camera mobile phone with an anti-shaking function and an anti-shaking method for use by the camera mobile phone in image capturing are disclosed. The anti-shaking method including the following steps of: A. using a gravity sensor module of the mobile phone to detect a shaking level of the mobile phone when capturing an image; B. according to the shaking level detected by the gravity sensor module, controlling an exposure time of the mobile phone in the process of capturing the image so that a camera module of the mobile phone captures the image according to the exposure time and C. using an image processing software program to carry out deblurring processing on the blurred image according to a displacement vector generated due to shaking.

12 Claims, 5 Drawing Sheets

(56) References Cited

U.S. PATENT DOCUMENTS

| | | | |
|---|---|---|---|
| 2005/0071118 A1* | 3/2005 | Usuda et al. | 702/145 |
| 2005/0248660 A1 | 11/2005 | Stavely et al. | |
| 2006/0092294 A1* | 5/2006 | Jang | 348/231.99 |
| 2006/0104620 A1* | 5/2006 | Ebato | 396/55 |
| 2007/0002145 A1* | 1/2007 | Furukawa | 348/207.99 |
| 2007/0097221 A1* | 5/2007 | Stavely et al. | 348/208.11 |
| 2007/0147813 A1* | 6/2007 | Washisu | 396/53 |
| 2007/0230938 A1* | 10/2007 | Hatanaka | 396/153 |
| 2008/0291288 A1* | 11/2008 | Tzur et al. | 348/222.1 |
| 2009/0174782 A1* | 7/2009 | Kahn et al. | 348/208.2 |
| 2009/0225174 A1* | 9/2009 | Handa et al. | 348/208.3 |
| 2010/0150537 A1* | 6/2010 | Tsuchihashi | 396/55 |
| 2010/0214423 A1* | 8/2010 | Ogawa | 348/208.4 |
| 2010/0277602 A1* | 11/2010 | Asano et al. | 348/208.4 |
| 2011/0129166 A1* | 6/2011 | Nishiyama | 382/263 |

FOREIGN PATENT DOCUMENTS

| | | |
|---|---|---|
| CN | 1798264 A | 7/2006 |
| CN | 200969608 Y | 10/2007 |
| CN | 101345824 A | 1/2009 |
| CN | 101729665 A | 6/2010 |

* cited by examiner

CAMERA MOBILE PHONE WITH
ANTI-SHAKING FUNCTION AND
ANTI-SHAKING METHOD FOR USE BY THE
CAMERA MOBILE PHONE IN IMAGE
CAPTURING

CROSS REFERENCE TO RELATED
APPLICATIONS

The present application is a 35 U.S.C. §371 National Phase conversion of International (PCT) Patent Application No. PCT/CN2010/079656, filed on Dec. 10, 2010, the disclosure of which is incorporated by reference herein. The PCT International Patent Application was published in Chinese.

FIELD OF THE INVENTION

The present disclosure generally relates to a camera mobile phone with anti-shaking function and an anti-shaking method used by the camera mobile phone in image capturing, and more particularly, to a camera mobile phone with an anti-shaking function and an anti-shaking method for use by the camera mobile phone in image capturing.

BACKGROUND OF THE INVENTION

With widespread use of camera mobile phones, people capture images by using their phones more and more frequently. However, just like digital cameras, the camera mobile phones also have the problem of anti-shaking.

However, copying the anti-shaking design of digital cameras would significantly increase the cost of the camera mobile phones, and the small size of camera phones also limits the application of technologies used in digital cameras. For these reasons, the anti-shaking effect of the camera mobile phones is not ideal.

Accordingly, improvements and advancements still have to be made in the art.

SUMMARY OF THE INVENTION

A primary objective of the present disclosure is to provide a camera mobile phone with an anti-shaking function and an anti-shaking method for use by the camera mobile phone in image capturing, which can realize an ideal anti-shaking image capturing function at a low cost on a mobile phone and especially on an intelligent mobile phone.

The technical solutions of the present disclosure are as follows.

An anti-shaking method for use by a mobile phone in image capturing, comprising the following steps of:

A. using a gravity sensor module of the mobile phone to detect a shaking level of the mobile phone when capturing an image;

B. according to the shaking level detected by the gravity sensor module, controlling an exposure time of the mobile phone in the process of capturing the image so that a camera module of the mobile phone captures the image according to the exposure time; and C. using an image processing software program to carry out deblurring processing on the blurred image according to a displacement vector generated due to shaking.

In the anti-shaking method, the step A further comprises:

A1. initiating an anti-shaking operation mode of the gravity sensor module by depressing a shutter button on the mobile phone;

A2. detecting shaking vectors in different directions during the image capturing process and calculating an absolute value of a sum of the shaking vectors; and A3. determining the shaking level during the image capturing process according to the absolute value.

In the anti-shaking method, the step A further comprises: sampling the shaking data detected by the gravity sensor module for a number of times, and averaging the sampled shaking data to determine the shaking level.

The anti-shaking method further comprises the following step prior to the step A:

pre-establishing a correspondence table between shaking levels and exposure times so that the exposure time can be determined by looking up the correspondence table.

In the anti-shaking method, the step C comprises the following steps:

C1. capturing a plurality of images during the image capturing process and extracting characteristic points;

C2. using a software program to analyze a blurring level of the images according to the characteristic points; and C3. making compensation on the images according to the analysis result and the displacement vector.

In the anti-shaking method, the step C further comprises: sampling the displacement vector generated due to the shaking in the image capturing process, and averaging the sampled displacement vectors to carry out deblurring processing on the image.

A camera mobile phone with an anti-shaking function, comprising a central processing unit (CPU) disposed on a mainboard of the camera mobile phone and a camera module disposed on a housing of the cameral mobile phone. The CPU is loaded with a driver for the camera module to capture an image when a shutter button on the camera mobile phone is depressed. The camera mobile phone further comprises a gravity sensor module and an image post-processing module. The CPU is loaded with a driver for the gravity sensor module, and is used for detecting a shaking level of the camera mobile phone when capturing the image so as to control an exposure time of the camera module during the image capturing process; and the CPU runs an image processing software program of the image post-processing module so as to carry out deblurring processing on the blurred image according to a displacement vector generated due to shaking.

In the camera mobile phone, the gravity sensor module further comprises a working register, and the CPU is configured to set data values in the working register so that the gravity sensor module is in an anti-shaking operation mode.

In the camera mobile phone, the gravity sensor module is a stream interface device, and the driver for the gravity sensor module is an independent stream interface driver.

In the camera mobile phone, the camera module is a stream interface device, and the driver for the camera module is an independent stream interface driver.

According to the camera mobile phone with an anti-shaking function and the anti-shaking method for use by the camera mobile phone in image capturing, by using the gravity sensor and the image post-processing technology, a first anti-shaking effect is achieved by controlling the exposure time according to the shaking level detected when the camera mobile phone captures the image; and a second anti-shaking effect is further achieved by make compensation on the blurred image according to the shaking displacement vector. In this way, an ideal anti-shaking image capturing function can be realized at a low cost on a mobile phone and especially on an intelligent mobile phone with a high-end gravity sensor.

DETAILED DESCRIPTION OF THE INVENTION

The present invention is further described in detail below with reference to the accompanying drawings and embodiments.

Figure 1:
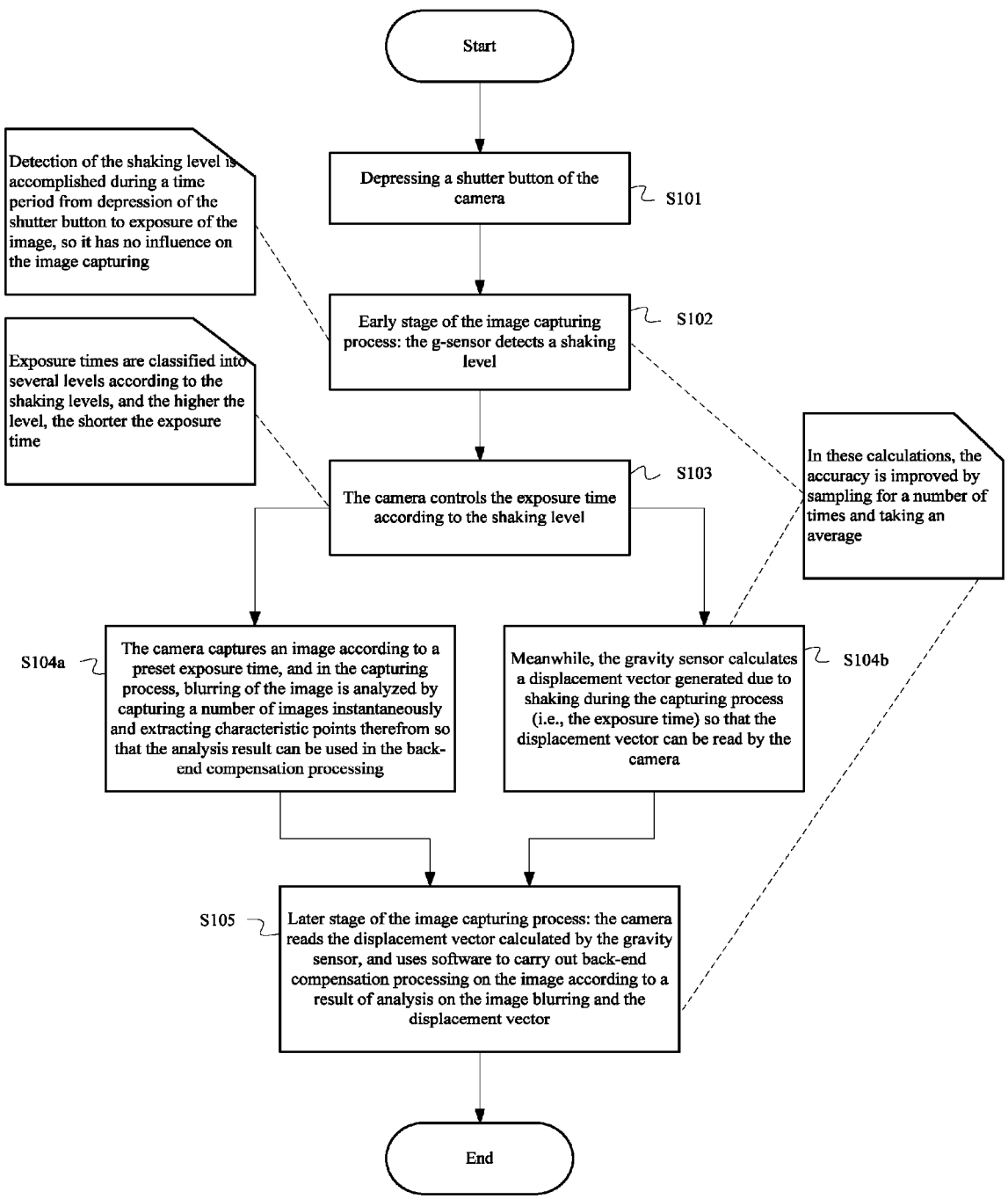
FIG. 1 is a flowchart of a dual anti-shaking process according to the present disclosure.

Referring to FIG. 1, an embodiment of an anti-shaking method for use by a camera mobile phone in image capturing according to the present disclosure comprises the following steps.

Step S101: depressing a shutter button of the mobile phone's camera.

Step S102: entering an early stage of the image capturing process. Specifically, a gravity sensor of the mobile phone detects a shaking degree in the image capturing process and determines a shaking level. The early stage of the image capturing process refers to a time period from depression of the shutter button to exposure of the image.

Step S103: the camera controls the exposure time according to the shaking level.

Steps S104a and S104b: on one hand, the camera captures the image according to the specified exposure time; and on the other hand, the gravity sensor calculates a displacement vector generated due to shaking during the exposure time (i.e., the capturing duration) so that the displacement vector can be read by the camera.

Step S105: entering a later stage of the image capturing process. Specifically, the camera reads the displacement vector, and uses an image processing software to carry out deblurring processing on the image according to a result of analysis on the image blurring. The later stage of the image capturing process refers to a time period from exposure of the image to completion of the image processing.

In the step S102, because detection of the shaking level is accomplished during the time period from depression of the shutter button to exposure of the image, it has no influence on the image capturing.

In the step S103, exposure times may also be classified into several levels according to the shaking levels. The higher the shaking level is, the shorter the exposure time will be. A correspondence table between the shaking levels and the exposure times may be pre-established prior to the step S102 so that the exposure time can be determined by looking up the correspondence table.

In the step S104a, blurring of the image may be analyzed by capturing a number of images instantaneously and extracting characteristic points therefrom so that the analysis result can be used in the back-end compensation processing. The characteristic points extracted here may be a same characteristic point in the several images, and this is also adopted in existing digital cameras and is well known to those skilled in the art.

In the steps S102, S104b and S105, the accuracy may be improved by sampling for a number of times and taking an average.

By means of accurate three-dimensional (3D) space sensing, accurate gravity acceleration detection, and high real-time performance provided by high-end gravity sensors, gravity acceleration values along the three axes in the space can be detected in the present disclosure. Thus, shaking in each direction can be detected and the shaking degree (i.e., the shaking level) can be calculated. For different shaking levels, the exposure times in the image capturing process are controlled to be different correspondingly; therefore, by specifying different shaking levels corresponding to different shaking degrees, different exposure times will be used by the camera at different shaking levels, thus achieving an anti-shaking effect flexibly.

The shaking level is a key parameter used by the camera to control the shutter speed, and is mainly determined by an absolute value of a sum of gravity acceleration vectors along the three axes in the space. The greater the absolute value of the gravity acceleration in a certain direction is, the higher the shaking level will be; and this parameter is obtained at an early stage of the image capturing process (i.e., a time period from depression of the shutter button to exposure of the image). Once the shutter button is depressed, the gravity sensor begins to operate. From the gravity acceleration values along the x, y and z axes, a sum of gravity acceleration vectors in a certain direction can be calculated so as to obtain the absolute value of the sum. By sampling for a number of times and then taking an average, a more accurate result can be obtained. The shaking level may be preset in the following way: some thresholds are set firstly, and then the absolute value of gravity acceleration in a certain direction is compared with the thresholds to obtain the shaking level. Because the shaking level is achieved by detecting the shaking degree and, in turn, the shaking degree is obtained through detection of 3D coordinates, the shaking displacement vector in a certain direction is also calculated according to the 3D coordinates.

Figure 2:
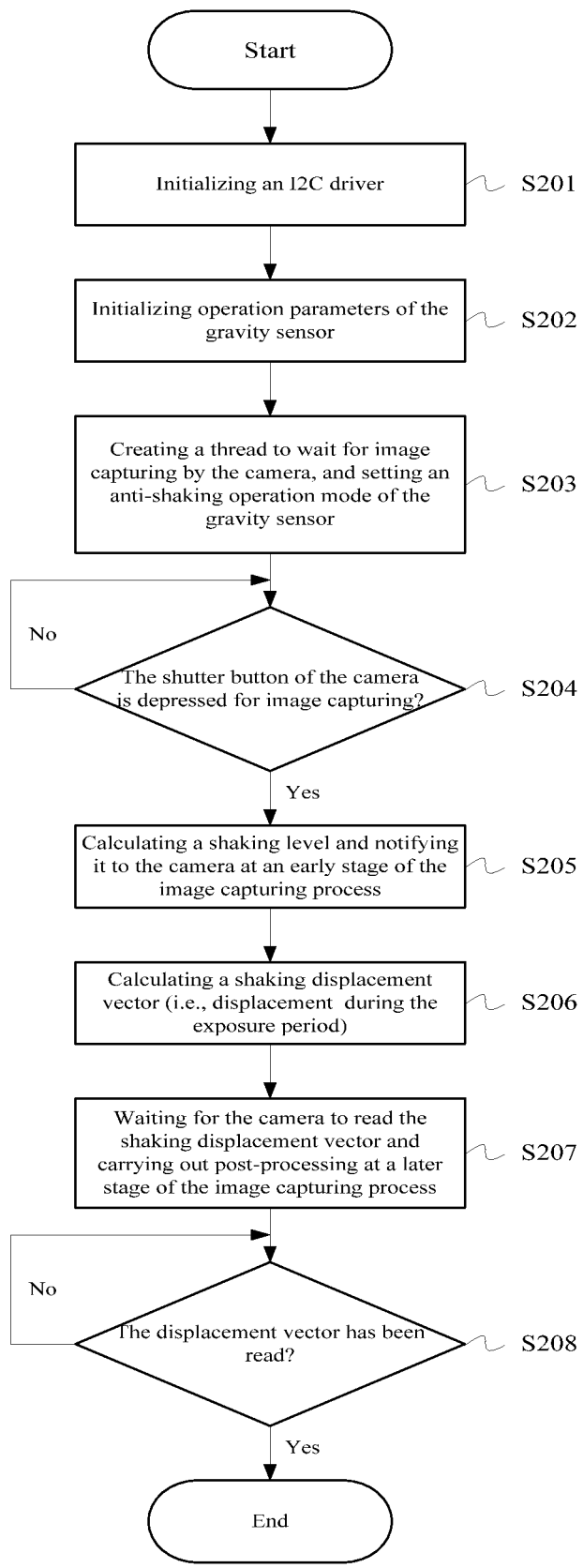
FIG. 2 is a flowchart of an operation process of a gravity sensor according to the present disclosure.

As shown in FIG. 2, an operation process of the gravity sensor is as follows.

Step S201: initializing an I2C driver.

Step S202: initializing operation parameters of the gravity sensor. The driver for the gravity sensor is loaded during the startup process of the system.

Step S203: creating a thread to wait for image capturing by the camera, and setting an anti-shaking operation mode of the gravity sensor.

Step S204: determining whether the shutter button of the camera is depressed for image capturing. If the answer is "yes", then the operation process proceeds to the step S205; and if the answer is "no", then keeping waiting.

Step S205: calculating a shaking level and notifying the shaking level to the camera at an early stage of the image capturing process.

Step S206: calculating a shaking displacement vector (i.e., the displacement and direction of the mobile phone during the exposure period).

Step S207: waiting for the camera to read the shaking displacement vector and carrying out post-processing on the image at a later stage of the image capturing process.

Step S208: determining whether the displacement vector of this image capturing process has been read. If the answer is "yes", then the operation process of the gravity sensor is ended; and if the answer is "no", then keep waiting.

During the image capturing process, blurring of the image is analyzed by capturing a number of images instantaneously and extracting characteristic points therefrom to analyze the images, and then the displacement vector generated due to the shaking is calculated by the gravity sensor. At a later stage of the image capturing process, back-end compensation processing is carried out on the image by software according to the result of the aforesaid blurring analysis in conjunction with the displacement vector. The compensation processing may be accomplished by image processing software used in digital cameras so as to deblur the blurred image, and this will not be further described herein.

The shaking displacement vector is a key parameter for the back-end image processing, and from this parameter, how much and in which direction the image shakes during the image capturing process can be known. Then, the compensation processing is carried out by the software according to the displacement to accomplish the back-end processing on the image. The displacement vector represents displacement in a certain direction caused by the shaking during the image capturing process (i.e., the exposure period). The following parameters are required for calculation of the displacement vector: the gravity acceleration values of the gravity sensor along the three axes, and the shaking duration (i.e., the exposure time), and from these parameters, the displacement vector generated due to the shaking can be calculated according to a specific algorithm. The gravity acceleration values along the three axes may be obtained more accurately by sampling the gravity accelerations for a number of times and taking an average.

Figure 3:
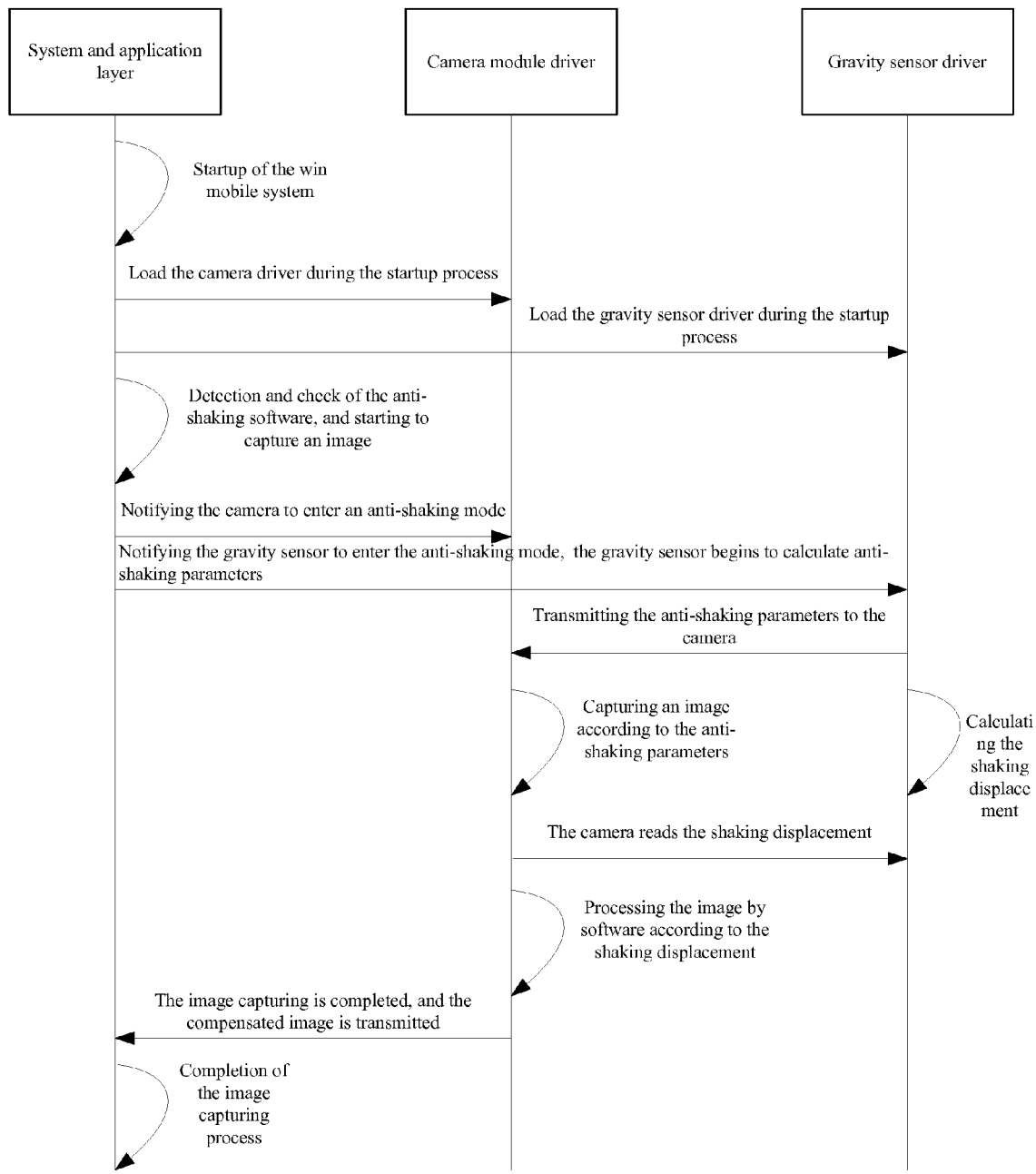
FIG. 3 is a flowchart of a general software communication process according to the present disclosure.

As a preferred embodiment of the present disclosure, communications between individual modules (i.e., the application layer, the camera and the gravity sensor) may be designed by using the "stream interface driver" of the win mobile system as a general design framework. The operation process of the general software communications mainly comprises the following respects: interface calling, parameter transferring and data sharing as shown in FIG. 3. The following two approaches are mainly used in the anti-shaking design for anti-shaking purpose. According to one approach, the light sensitivity (High ISO) of the camera is increased when shaking is detected by the gravity sensor so as to increase the shutter speed (i.e., shorten the exposure time) to be higher than the safety shutter; this approach changes the shutter speed, so it can not only improve the shaking problem of the camera but also allow for better capturing of moving objects. According to the other approach, the displacement caused by the shaking is calculated by the gravity sensor, and then analysis and processing are made on the image obtained from the image capturing process; i.e., displacement compensation is made by the software on the blurred image captured under the shaking conditions, and the displacement used here is just the shaking displacement vector calculated by the gravity sensor. The latter approach is a kind of back-end processing. By using the two anti-shaking approaches to provide a dual anti-shaking effect, reliability of the anti-shaking effect is guaranteed.

Figure 4:
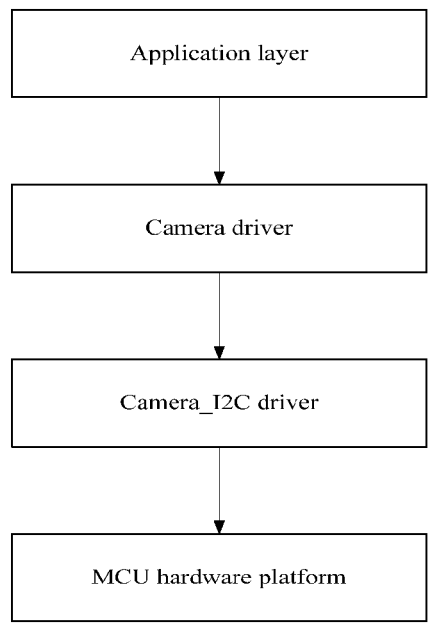
FIG. 4 is a design block diagram of a stream interface driver for a camera according to the present disclosure.
Figure 5:
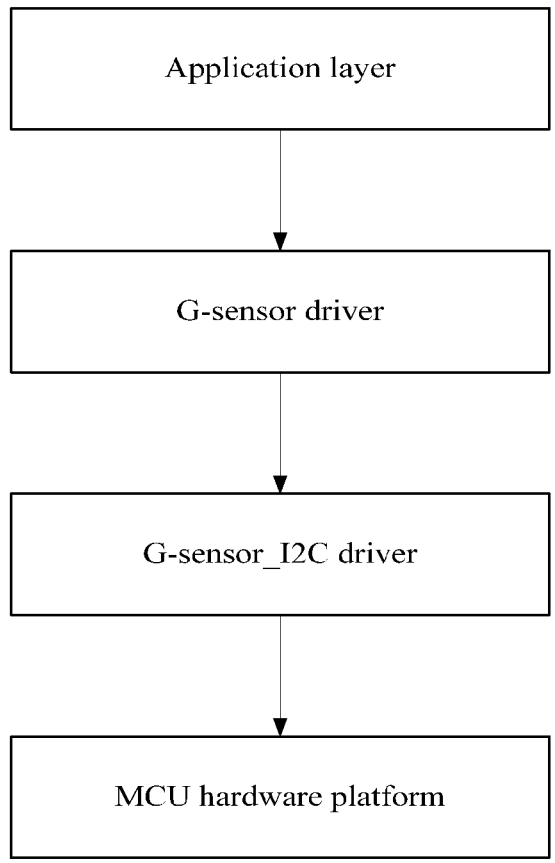
FIG. 5 is a design block diagram of a stream interface driver for a gravity sensor according to the present disclosure.

For example, in the software communication process of the mobile phone, an "independent stream interface driver" may be adopted to establish the general software framework; i.e., the drivers for the camera and the gravity sensor are designed as independent stream interface drivers on the win mobile platform, and corresponding I2C drivers are designed respectively to communicate with PXA310. These drivers are loaded during the startup process of the system. In this way, a well organized hierarchical structure which can be conveniently managed by the system is formed as shown in FIG. 4 and FIG. 5. In design of the stream interface drivers, communications between the individual modules adopt specific interfaces, and data sharing is accomplished by use of registries, events or memories. In these manners, the hierarchical design and the interface calling can be well organized, so communications between the individual modules can be achieved with desirable stability and high efficiency.

The present disclosure provides a camera mobile phone with an anti-shaking function, comprising a CPU disposed on a mainboard of the camera mobile phone and a camera module disposed on a housing of the cameral mobile phone. The CPU is loaded with a driver for the camera module to capture an image when a shutter button on the camera mobile phone is depressed. The camera mobile phone further comprises a gravity sensor module and an image post-processing module. The CPU is loaded with a driver for the gravity sensor module, and the driver for the gravity sensor module is used to detect a shaking level of the camera mobile phone when capturing the image so as to control an exposure time of the camera module during the image capturing process; and the CPU runs an image processing software program of the image post-processing module so as to carry out deblurring processing on the blurred image according to a displacement vector generated due to shaking.

Further, the gravity sensor module further comprises a working register, and the CPU is configured to set data values in the working register so that the gravity sensor module is in an anti-shaking operation mode.

Preferably, the gravity sensor module is a stream interface device and the driver for the gravity sensor module is an independent stream interface driver; and/or the camera module is a stream interface device and the driver for the camera module is an independent stream interface driver.

Figure 6:
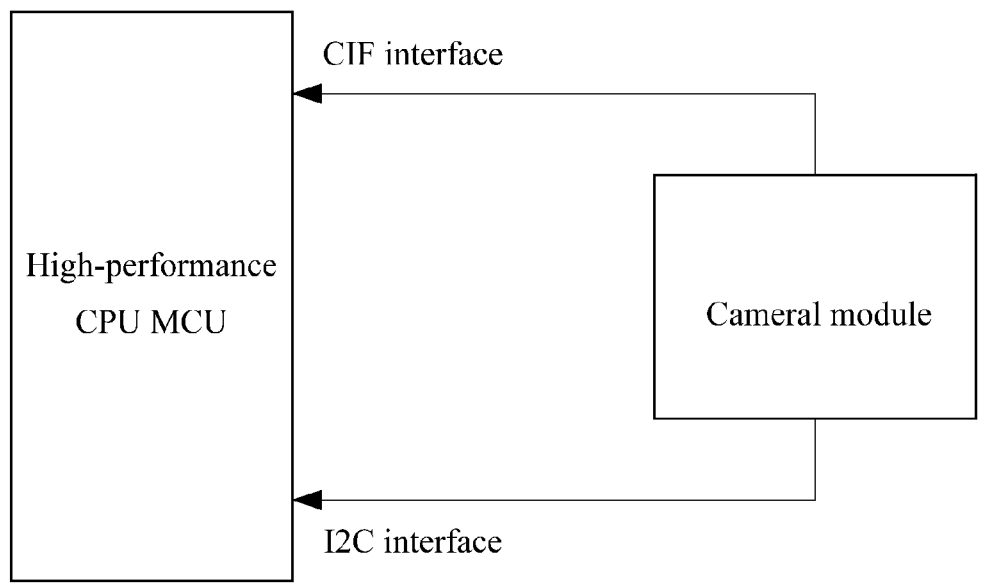
FIG. 6 is a hardware block diagram of a camera module according to the present disclosure.
Figure 7:
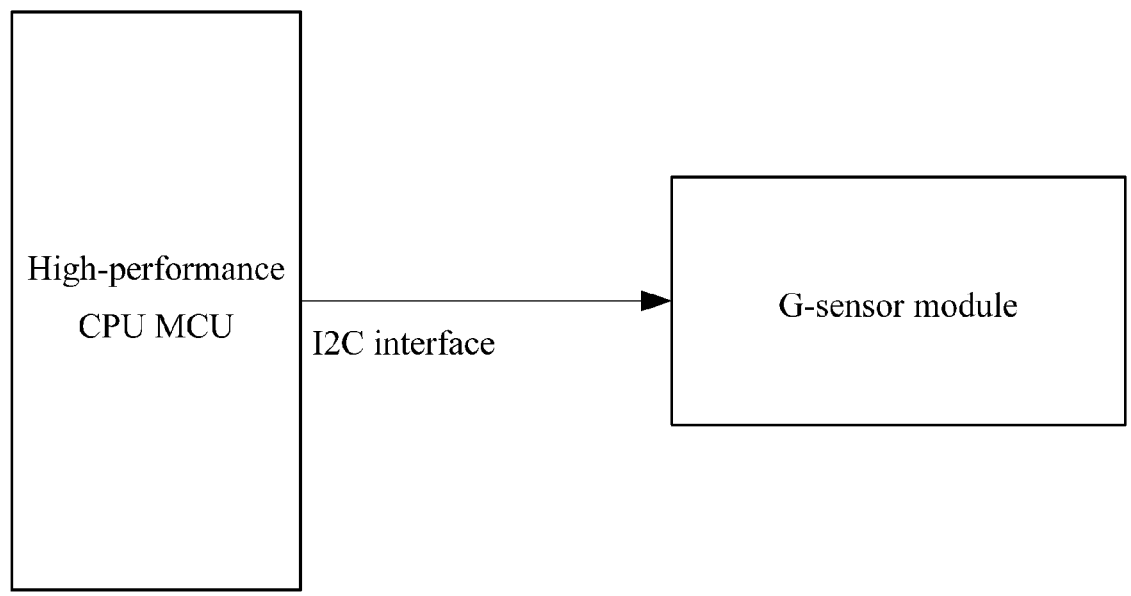
FIG. 7 is a hardware block diagram of a gravity sensor module according to the present disclosure.

Hereinafter, PXA 310, a high-performance MCU, will be taken as an example. As shown in FIG. 6, there are mainly two interfaces between PXA310 and the camera module, namely, the I2C interface and the CIF interface. The I2C interface is used for communications between the CPU and the camera, and the CPU sends commands to the camera module via the I2C interface. The CIF interface is used by PXA310 to receive data from the camera module. As shown in FIG. 7, communications between PXA 310 and the gravity sensor module are accomplished mainly through the I2C interface. The CPU works as a master and the gravity sensor works as a slave, and the CPU enables the gravity sensor to operate in different modes by setting a working register of the gravity sensor. Then, by reading gravity acceleration values along the x, y and z axes, the displacement vector of the mobile phone can be calculated according to a specific algorithm, thus obtaining various parameters necessary for anti-shaking.

INDUSTRIAL APPLICABILITY 1. small volume: both the high-end gravity sensor module and the camera module have a small volume, the benefits from which are self-evident to mobile phones which are very sensitive to sizes of components. In conventional camera mobile phones, efforts are made mainly on the camera module in order to achieve an anti-shaking effect, but this tends to cause a too large size of the camera module and is limited by the size of mobile phones to a great extent. In contrast, the present disclosure can effectively avoid the limitation imposed by the camera module's size, and can readily achieve the anti-shaking effect without changing the volume of the mobile phones.

2. desirable effect: by using the high-end gravity sensor to detect shaking accurately and then taking dual anti-shaking measures at an early stage and a later stage of the image capturing process respectively, an effective anti-shaking effect can be achieved at different stages of the image capturing process, thus ensuring a desirable anti-shaking effect. On the other hand, detection of the very fine shaking requires a very high accuracy of sensors, and the high-end gravity sensor having much higher accuracy than common sensors can just satisfy this need and further ensure the anti-shaking effect.

3. good stability: by means of the "stream interface driver" for communications in intelligent mobile phones, the gravity sensor and the camera module are combined together; communications between the individual modules adopt specific interfaces; and data sharing is accomplished by use of registries, events or memories. In these manners, the hierarchical design and the interface calling can be well organized, so communications between the individual modules are accomplished with desirable stability and high efficiency.

4. low cost: the high-end gravity sensor (not dedicated to anti-shaking specially) equipped in the mobile phone is used. The high-end gravity sensor is completely able to complete the anti-shaking task apart from completing other tasks. This can, on one hand, make full use of the high-end gravity sensor, and on the other hand, make it unnecessary to consume additional hardware cost for anti-shaking purpose. Thereby, an effective anti-shaking effect can be achieved without increasing the hardware cost.

5. High flexibility: achievement of the anti-shaking effect is independent on performance of the camera module of the mobile phone. Therefore, in terms of hardware, the anti-shaking effect can be achieved by use of a common camera module in combination with a high-end gravity sensor, which makes hardware arrangement of the mobile phone very flexible; and in terms of software, the high-end gravity sensor and the camera can be controlled by software flexibly. Thereby, unlike the conventional camera mobile phones where anti-shaking is solely dependent on performance of the camera module with less dependence on the software configuration, the anti-shaking operations can be controlled by the software flexibly.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An anti-shaking method for use by a mobile phone in image capturing, comprising the following steps of:
    (A) using a gravity sensor module of the mobile phone to detect a shaking level of the mobile phone when capturing an image;
    (B) according to the shaking level detected by the gravity sensor module, controlling an exposure time of the mobile phone in the process of capturing the image so that a camera module of the mobile phone captures the image according to the exposure time; and
    (C) using an image processing software program to carry out deblurring processing on the blurred image according to a displacement vector generated due to shaking;
    wherein the step (A) comprises the following steps:
    (A1) initiating an anti-shaking operation mode of the gravity sensor module by depressing a shutter button on the mobile phone;
    (A2) detecting shaking vectors in different directions during the image capturing process and calculating an absolute value of a sum of the shaking vectors; and
    (A3) determining the shaking level during the image capturing process according to the absolute value;
    wherein the gravity sensor module is not dedicated to anti-shaking specially, is independent from the camera module, and further comprises a working register that has data values set so that the gravity sensor module is in an anti-shaking operation mode; and
    wherein the gravity sensor module is able to complete the anti-shaking method apart from completing other tasks.

2. The anti-shaking method of claim 1, wherein the step (A) further comprises: sampling the shaking data detected by the gravity sensor module for a number of times, and averaging the sampled shaking data to determine the shaking level.

3. The anti-shaking method of claim 1, further comprising the following step prior to the step (A):
    pre-establishing a correspondence table between shaking levels and exposure times so that the exposure time can be determined by looking up the correspondence table.

4. The anti-shaking method of claim 1, wherein the step (C) comprises the following steps:
    (C1) capturing a plurality of images during the image capturing process and extracting characteristic points;
    (C2) using a software program to analyze a blurring level of the images according to the characteristic points; and
    (C3) making compensation on the images according to the analysis result and the displacement vector.

5. The anti-shaking method of claim 1, wherein the step (C) further comprises: sampling the displacement vector generated due to the shaking in the image capturing process, and averaging the sampled displacement vectors to carry out deblurring processing on the image.

6. An anti-shaking method for use by a mobile phone in image capturing, comprising the following steps of:
    (Step S101) depressing a shutter button of the mobile phone's camera;
    (Step S102) entering an early stage of the image capturing process, and a gravity sensor of the mobile phone detecting a shaking degree in the image capturing process and determining a shaking level during the early stage;
    (Step S103) controlling the exposure time according to the shaking level;
    (Steps SI04a and SI04b) the camera capturing the image according to the specified exposure time while the gravity sensor calculates a displacement vector generated due to shaking during the exposure time so that the displacement vector can be read by the camera; and
    (Step S105) entering a later stage of the image capturing process, and the camera reading the displacement vector, and using an image processing software to carry out deblurring processing on the image according to a result of analysis on the image blurring during the later stage;
    wherein once the shutter button is depressed, the gravity sensor begins to operate, and from the gravity acceleration values along x, y and z axes, a sum of gravity acceleration vectors in a certain direction can be calculated so as to obtain the absolute value of the sum, and then, by sampling for a number of times and then taking an average, a more accurate result can be obtained, and the shaking level is preset in the following way: some thresholds are set, and then the absolute value of gravity acceleration in a certain direction is compared with the thresholds to obtain the shaking level;
    wherein the gravity sensor is not dedicated to anti-shaking specially, is independent from the camera, and further comprises a working register that has data values set so that the gravity sensor is in an anti-shaking operation mode; and
    wherein the gravity sensor is able to complete the anti-shaking method apart from completing other tasks.

7. The anti-shaking method of claim 6, wherein the early stage of the image capturing process refers to a time period from depression of the shutter button to exposure of the image.

8. The anti-shaking method of claim 6, wherein the later stage of the image capturing process refers to a time period from exposure of the image to completion of the image processing.

9. The anti-shaking method of claim 6, wherein a correspondence table between the shaking levels and the exposure times is pre-established prior to the step S102, and the exposure time is decreased with the shaking level increasing.

10. The anti-shaking method of claim 6, wherein in the step S104a, blurring of the image is analyzed by capturing a number of images instantaneously and extracting characteristic points therefrom so that the analysis result can be used in a back-end compensation processing.

11. The anti-shaking method of claim 6, wherein an operation process of the gravity sensor is as follows:
(Step S201) initializing an I2C driver;
(Step S202) initializing operation parameters of the gravity sensor and the driver for the gravity sensor loaded during a startup process of the system;
(Step S203) creating a thread to wait for image capturing by the camera, and setting an anti-shaking operation mode of the gravity sensor;
(Step S204) determining whether the shutter button of the camera is depressed for image capturing, if the determination is "yes", then the operation process proceeds to the step S205, and if the determination is "no", then keeping waiting;
(Step S205) calculating a shaking level and notifying the shaking level to the camera at an early stage of the image capturing process;
(Step S206) calculating a shaking displacement vector;
(Step S207) waiting for the camera to read the shaking displacement vector and carrying out post-processing on the image at a later stage of the image capturing process; and
(Step S208) determining whether the displacement vector of this image capturing process has been read, if the determination is "yes", then the operation process of the gravity sensor is ended, and if the determination is "no", then keep waiting.

12. The anti-shaking method of claim 11, wherein the displacement vector represents displacement in a certain direction caused by the shaking during the image capturing process, and the following parameters are required for calculation of the displacement vector: the gravity acceleration values of the gravity sensor along x, y and z axes, and a shaking duration, and from these parameters, the displacement vector generated due to the shaking can be calculated according to a specific algorithm.

* * * * *